United States Patent [19]

Stoub

[11] Patent Number: 4,599,690
[45] Date of Patent: Jul. 8, 1986

[54] METHOD AND CIRCUIT FOR CORRECTING COUNT RATE LOSSES OF RADIATION EVENTS

[75] Inventor: Everett W. Stoub, Villa Park, Ill.

[73] Assignee: Siemens Gammasonics, Inc., Des Plaines, Ill.

[21] Appl. No.: 549,866

[22] Filed: Nov. 9, 1983

[51] Int. Cl.[4] ............................................. G01T 1/20
[52] U.S. Cl. .................................. 364/414; 364/527; 364/571; 250/363 R
[58] Field of Search ............... 364/414, 527, 571, 717, 364/555; 250/363 SR, 361 C, 356.2, 357.1; 358/110, 111; 324/71.4; 377/30

[56] References Cited

U.S. PATENT DOCUMENTS

| | | | |
|---|---|---|---|
| 3,896,296 | 7/1975 | Barnhart | 377/30 |
| 4,058,728 | 11/1977 | Nickles | 250/369 |
| 4,369,495 | 1/1983 | Inbar et al. | 364/414 |

OTHER PUBLICATIONS

"Deadtime Characteristics of Anger Cameras", by James A. Sorenson, Journal of Nuclear Medicine, Apr. 1975, vol. 16, No. 4, Lines 284–288.
"The Influence of True Counting Rate and the Photo Peak Fraction of Detected Events on Anger Camera Deadtime", by John E. Arnold et al., Journal of Nuclear Medicine, Jun. 1974, vol. 15, No. 6, Lines 412–416.
"Theoretical Studies of Image Artifacts and Counting Losses for Different Photon Fluence Rates and Pulse-Height Distributions in Single-Crystal NaI(T1) Scintillation Cameras" by Sven-Erik Strand et al., The Journal of Nuclear Medicine 1980, vol. 21, pp. 264–275.
"Correction for Deadtime Losses in a Gamma Camera/Data Analysis System", by K. Cranley et al., European Journal of Nuclear Medicine 5, 1980, pp. 377–382.
"On the Performance of Loss-Free Counting: A Method for Real-Time Compensation of Dead-Time and Pile-Up Losses in Nuclear Pulse Spectroscopy", by G. P. Westphal, Nuclear Instruments & Methods 163 (1979), pp. 189–196, N. Holland Publishing Co.
"Counting Errors in Amplitude Spectrometry of Pulses (Survey)", by V. B. Ivanov et al., Instruments and Experimental Technology, vol. 22, No. 6, Part 1, Nov.–Dec. 1979, pp. 1491–1508.
Tanaka et al., "New Anger Scintillation Cameras with Improved Count Rate Capability", Jul. 1980, pp. 8–13, vol. 29, No. 7, Radioisotopes (Japan).

Primary Examiner—Gary Chin
Assistant Examiner—Thomas G. Black
Attorney, Agent, or Firm—Mark H. Jay

[57] ABSTRACT

Radiation events of a radiation detector which are subject to deadtime losses during the acquisition time are detected as event triggers. For each detected radiation event a deadtime signal is provided. The acquisition time is subdivided into a succession of evaluation time intervals and the fractional amount of deadtime is measured within each evaluation time interval to obtain a measure for count rate losses. From the fractional amount of deadtime a replication probability is evaluated and dependent thereon all radiation events detected between the end of one evaluation time and the end of a following one are evaluated to generate (a) one pulse for each detected radiation event; and (b) a sequence of a number of pulses for randomly selected events.

20 Claims, 5 Drawing Figures

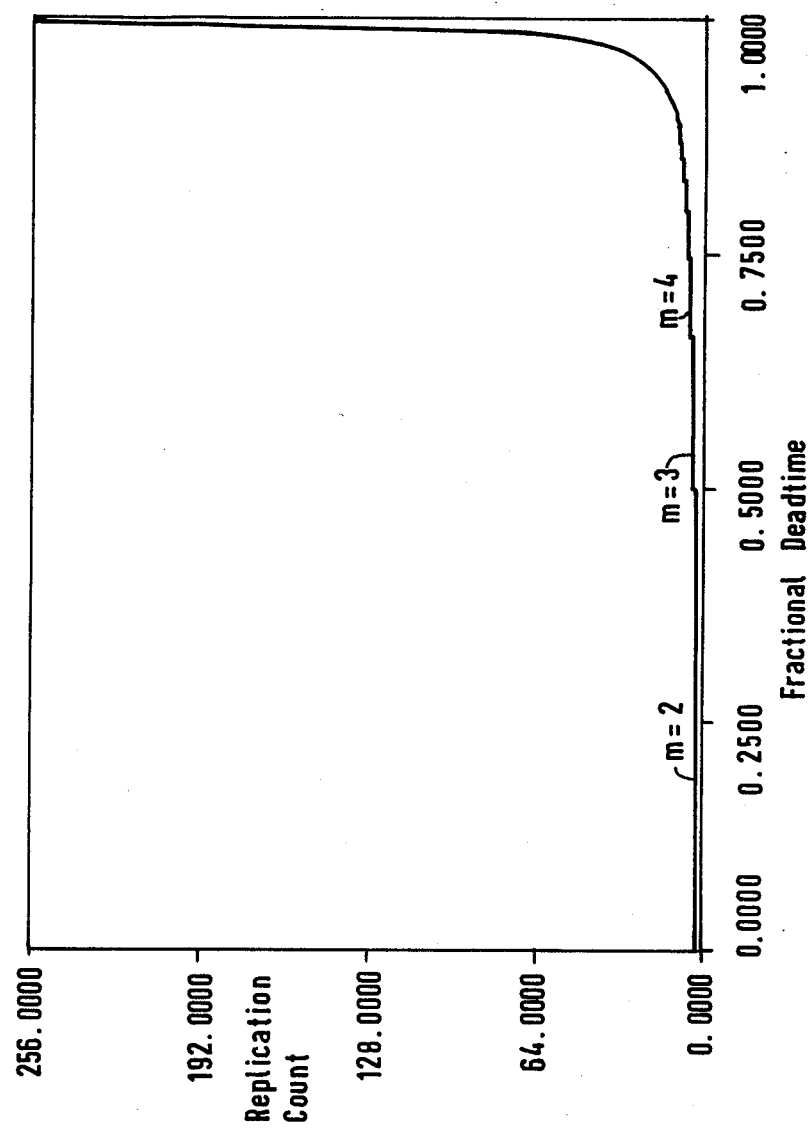

METHOD AND CIRCUIT FOR CORRECTING COUNT RATE LOSSES OF RADIATION EVENTS

BACKGROUND OF THE INVENTION

1. Field of the Invention

This invention relates to a method for correcting count rate losses of radiation events measured by a radiation detector, such as for example, a scintillation gamma camera, due to detector deadtimes during an acquisition time.

2. Description of Prior Art

Radiation detectors, such as for example, scintillation gamma cameras of the Anger type have data losses at high counting rates (see for example the essays "Deadtime Characteristics of Anger Cameras", by James A. Sorenson, Journal of Nuclear Medicine, April 1975, Vol. 16, No. 4, lines 284–288; and "The Influence of True Counting Rate and the Photopeak Fraction of Detected Events on Anger Camera Deadtime", by John E. Arnold et al., Journal of Nuclear Medicine, June 1974, Vol. 15, No. 6, lines 412–416). The correlation between counting losses and image distortion (i.e. attenuation) is for example described in the essay "Theoretical Studies of Image Artifacts and Counting Losses for Different Photon Fluence Rates and Pulse-Height Distributions in Single-Crystal NaI(T1) Scintillation Cameras" by Sren-Erik Strand et al., The Journal of Nuclear Medicine 1980, Vol. 21, pages 264–275.

Some correction for the events lost due to dead time (including pile-ups) has been tried by introducing a multiplication factor to scale the data that is detected after it has been received (an "after the fact" correction) as described for example in the essay "Correction for Deadtime Losses in a Gamma Camera/Data Analysis System", by K. Cranley et al., European Journal of Nuclear Medicine 5, 1980, Pages 377–382, in the U.S. Pat. No. 4,058,728 (Nickles) or U.S. Pat. No. 4,369,495 (Inbar et al.). To be accurate it would be necessary to know the relationship between the activity level and the event loss probability. The disadvantages of this technique are: that within each incremented time frame the dead time can change; the frame needs to be retained long enough to make the correction; and the relationship needs to be known between activity level and dead time.

Other correction for events lost has been tried by increasing the acquisition time in accordance with the level of activity to account for lost pulses as described for example in the essay "On The Performance of Loss-Free Counting-A Method for Real-Time Compensation of Dead-Time and Pile-Up Losses in Nuclear Pulse Spectroscopy", by G. P. Westphal, Nuclear Instruments and Methods 163 (1979) pages 189–196, North-Holland Publishing Co. This has a disadvantage for real time studies, such as cardiac flow, where comparisons are needed with equal time intervals.

SUMMARY OF THE INVENTION

1. Objects

It is an object of this invention to provide an improved method and circuit for correcting count rate losses.

It is another object of this invention to provide an improved method and circuit for correcting count rate losses such as to enhance the utility of scintillation camera image data for quantification under circumstances of widely varying input event rates (cardiac bolus studies, for example), when either relative or absolute ratioisotope activity levels are of interest.

It is still another object of this invention to provide an improved method and circuit for real-time correction of data losses to enhance quantitative data analysis in time-random event detectors.

2. Summary

According to this invention a method is provided for correcting count rate losses of radiation events measured by a radiation detector due to detector deadtimes during an acquisition time, comprising the steps of:
(a) detecting radiation events which are subject to deadtime losses during the acquisition time to obtain a succession of radiation detector event triggers;
(b) providing for each detected radiation event a deadtime signal which corresponds to the deadtime generated by the detected radiation event;
(c) subdividing the acquisition time into a succession of evaluation time intervals;
(d) measuring the fractional amount of deadtime within each evaluation time interval to obtain a measure for count rate losses;
(e) evaluation from the fractional amount of deadtime a replication probability r according to the equation $$r = DT'/(1-DT')(m-1),$$

wherein $DT'$ is the fractional amount of deadtime and m is a replication number only so large as to make the replication probability be less than one for any particular fractional amount of deadtime; and
(f) evaluating all radiation events detected between the end of one evaluation time and the end of a following one to generate
  (f1) one pulse for each detected radiation event between the ends of the succeeding evaluation times; and
  (f2) a sequence of a number of pulses for randomly selected events which selection corresponds to the replication probability and which pulse number corresponds to the replication number.

Also according to this invention a circuit is provided for correcting count rate losses of radiation events measured by a radiation detector due to detector deadtimes during an acquisition time, comprising:
(a) means for detecting radiation events which are subject to deadtime losses during the acquisition time to obtain a succession of radiation detector event triggers;
(b) means for providing for each detected radiation event a deadtime signal which corresponds to the deadtime generated by the detected radiation event;
(c) means for subdividing the acquisition time into a succession of evaluation time intervals;
(d) means for measuring the fractional amount of deadtime within each evaluation time interval to obtain a measure for count rate losses;
(e) means for evaluating from the fractional amount of deadtime a replication probability r according to the equation $$r = DT'/(1-DT')(m-1)$$

wherein $DT'$ is the fractional amount of deadtime and m is a replication number only so large as to make the replication probability be less than one for any particular fractional amount of deadtime; and (f) means for evaluating all radiation events detected between the end of one evaluation time and the end of a following one to generate
  (f1) one pulse for each detected radiation event between the ends of the succeeding evaluation times; and
  (f2) a sequence of a number of pulses for randomly selected events which selection corresponds to the replication probability and which pulse number corresponds to the replication number.

According to this invention controlled replication of individual events in real time can be used to compensate for the loss of individual events due to count rate limitations present in a given radiation detector, for example a scintillation radiation camera. In contrast to the prior art this allows for correcting count rate losses with highest efficiency.

The foregoing and other objects, features and advantages of the invention will be apparent from the following more particular description of preferred embodiments of the invention, as illustrated in the accompany drawings.

BRIEF DESCRIPTION OF THE DRAWINGS

In the drawings:

FIG. 5 is a diagram showing the replication count versus fractional deadtime.

DETAILED DESCRIPTION OF THE PREFERRED EMBODIMENT

Figure 1:
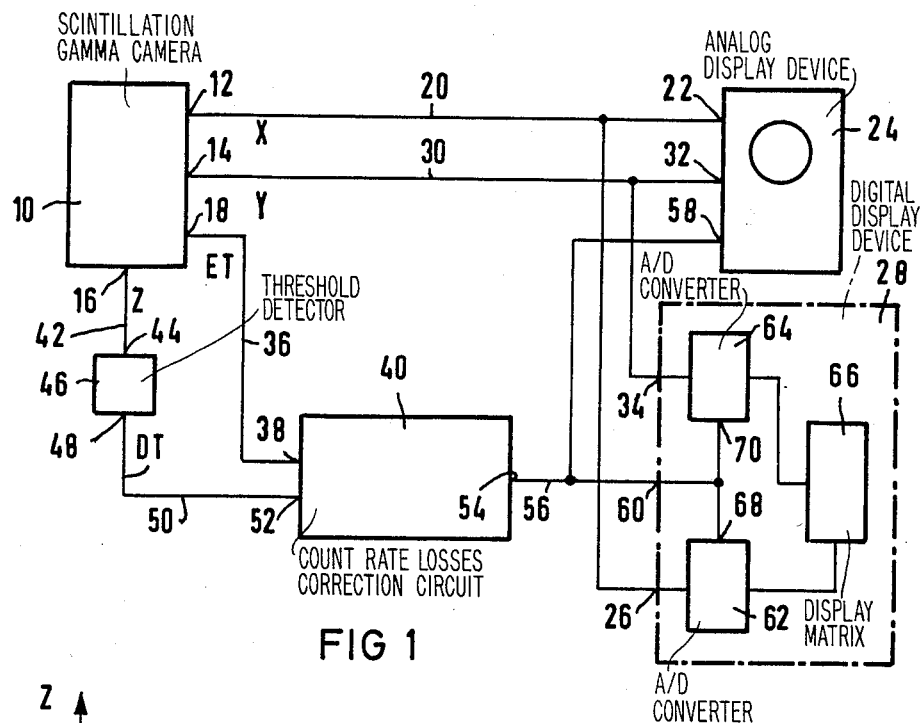
FIG. 1 is a block diagram of a scintillation gamma camera comprising the invention.

In FIG. 1 a scintillation gamma camera 10 (such as for example described in U.S. Pat. No. 4,316,257) comprises an output 12 for the x-position coordinate signal, an output 14 for the y-position coordinate signal, an output 16 for the z (energy) signal and an output 18 for an event trigger signal ET. The output 12 of the scintillation gamma camera 10 for the x-position coordinate signal is connected via line 20 with the horizontal input 22 of an analog display device 24 (such as an oscilloscope) and the horizontal input 26 of a digital display device 28, respectively. Correspondingly, the output 14 of the scintillation gamma camera 10 for the y-position coordinate signal is connected via line 30 with the vertical input 32 of the analog display device 24 and the vertical input 34 of the digital display device 28.

The output 18 of the scintillation gamma camera 10 for the event trigger signal ET is connected via line 36 with a first input 38 of a count rate losses correction circuit 40 according to the invention. The output 16 of the scintillation gamma camera 10 for the z-signal is connected via line 42 with the input 44 of a threshold detector 46. The output 48 of the threshold detector 46, which produces a camera deadtime signal DT, is connected via line 50 with the second input 52 of the count rate losses correction circuit 40. The output 54 of the count rate losses correction circuit 40 is connected via line 56 with the trigger input 58 of the analog display device 24 and with the trigger input 60 of the digital display device 28, respectively.

The digital display device 28 comprises an analog-to-digital converter 62 for the x-position coordinate signal, an analog-to-digital converter 64 for the y-position co-ordinate signal and a display matrix 66 connected to the outputs of the analog-to-digital converters 62 and 64. Both analog-to-digital converters 62 and 64 are triggered by the output signal of the count rate losses correcting circuit 40 at start inputs 68 and 70, respectively.

Figure 2:
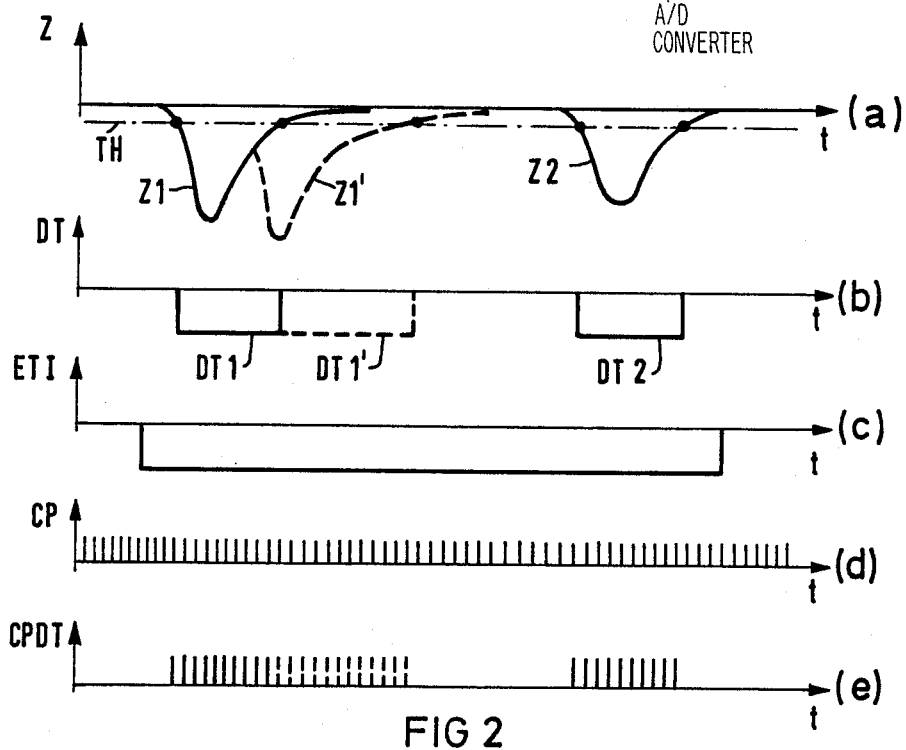
FIG. 2 is a pulse diagram.

The scintillation gamma camera 10 normally produces at its z-output 16 signals Z1, Z2 etc., as indicated in line (a) of FIG. 2. In response to each pulse Z1, Z2 etc., which exceeds the threshold TH of the threshold discriminator 46 the latter one produces a deadtime signal DT1, DT2 etc., at its output 48 as shown in line (b) of FIG. 2. The dead time signal DT may become longer as normal when a pulse-pile-up event occurs as illustrated in FIG. 2 with pile-up pulse Z1'. Pulse Z1' appears before pulse Z1 has been decayed below the threshold TH of the threshold discriminator 46. Thus the threshold discriminator 46 does not return into the zero position when Z1 falls below TH. It stays in its event indicating position till Z1' finally, falls below TH. The result is a pulse DT=DT1+DT1' as shown in line (b) of FIG. 2.

Figure 3:
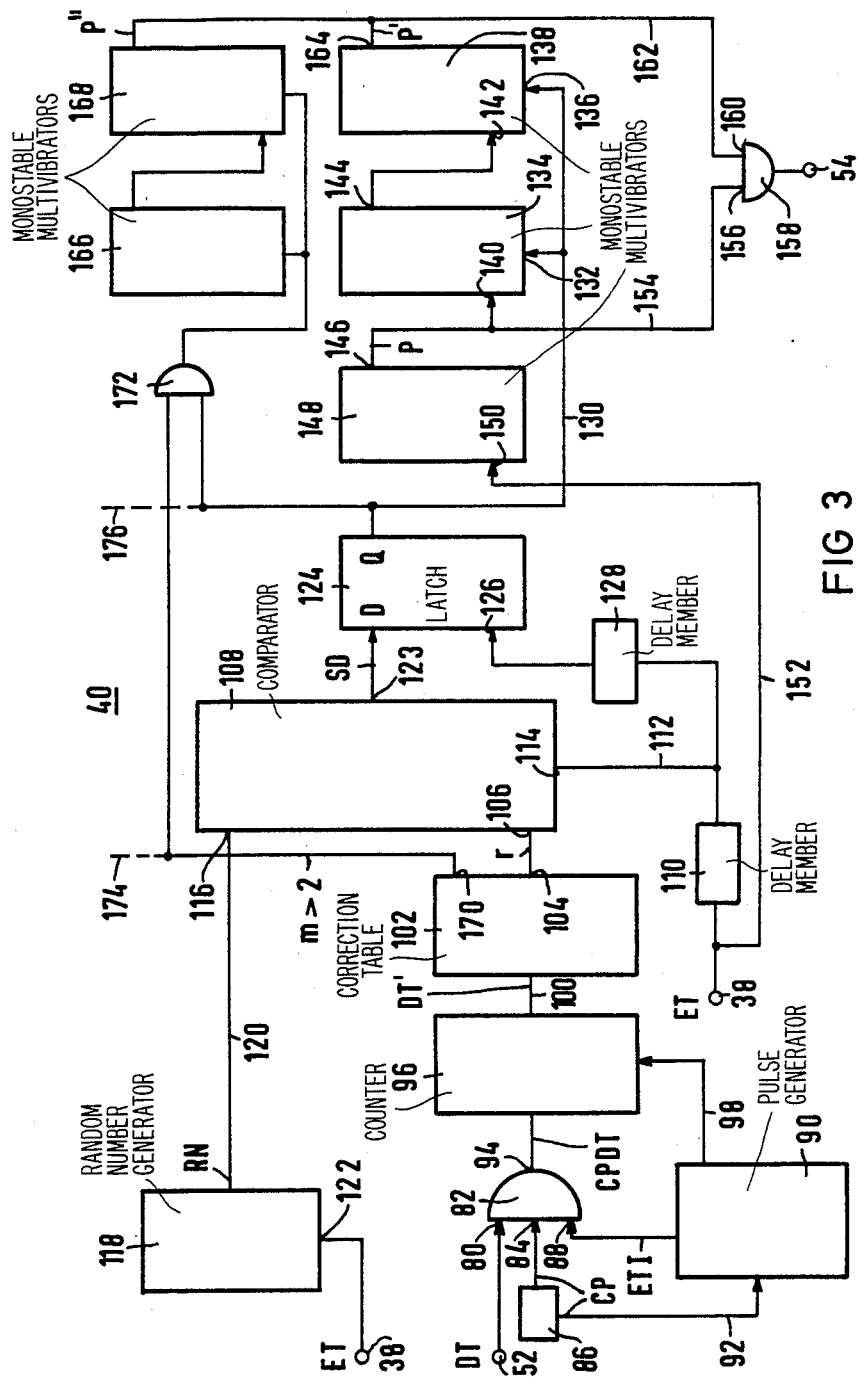
FIG. 3 is a block diagram showing the invention.

As illustrated in FIG. 3 the camera deadtime signal DT generated by the threshold discriminator 46 is supplied via input 52 of the count rate losses correcting circuit 40 to a first input 80 of a logic gate 82 inside the correcting circuit 40. A second input 84 of the gate 82 is fed by clock pulses CP of a (e.g. 1 MHz) clock 86, as indicated in line d) of FIG. 2. A third gate input 88 is fed with 1 ms pulses, periodically generated by a pulse generator 90. The pulse generator 90 is also clocked by the clock pulses CP of the clock 86 via line 92.

The 1 ms pulses of the pulse generator 90 subdivide the acquisition time (about 3 min.) of the scintillation gamma camera 10 into a succession of evaluation time intervals ETI, as indicated in line c) of FIG. 2. The pulse shown there is one of the 1 ms pulses produced by the pulse generator 90 at the input 88 of the gate 82. According to the supply of signals DT, CP and ETI gate 82 delivers at its output 94 a number of pulses CPDT which corresponds to the number of pulses which have been generated by clock 86 during deadtimes DT1 (or DT1+DT1'), DT2 etc., indicated by deadtime signal DT during the occurrence of a 1 ms evaluation time interval ETI. The pulses CPDT, which are illustrated in line e) of FIG. 2 are fed into a counter 96 which has a count capacity, which corresponds at least approximately to the maximum number of those clock pulses that can occur during an evaluation time interval of 1 ms for example (e.g. 1024 max counter). The counter 96, which is reset by pulse generator 90 via line 98 every 2 ms, measures the fractional amount DT' of deadtime within each evaluation time interval ETI to obtain a measure for count rate losses. The measured fractional amount DT' is then transferred via line 100 to a correction table 102 (e.g. 1024 entry ROM table).

Figure 4:
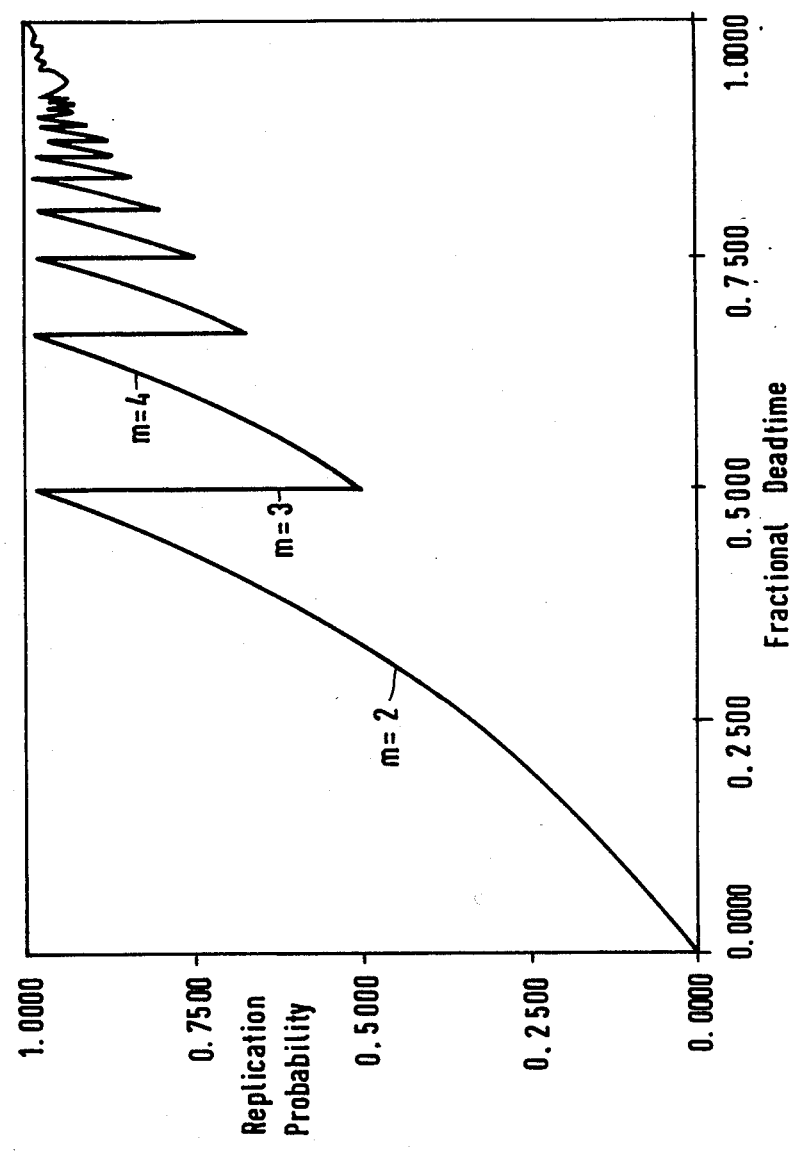
FIG. 4 is a diagram showing the replication probability versus fractional deadtime.

The correction table 102 evaluates from the fractional amount DT' of deadtime a replication probability r according to the equation $$r = DT'/(1-DT')(m-1),$$

wherein m is a replication number (m=2, 3, 4, etc.) only so large as to make the replication probability be less than one (r<1) for any particular fractional amount of deadtime. This situation is llustrated in FIGS. 4 and 5.

The replication probability r at output 104 of correction table 102 is supplied to a first input 106 of a comparator 108 (e.g. 8 bit comparator), which is triggered by the camera event trigger signal ET (input 38 of the count rate losses correcting circuit 40) via delay member 110 and line 112 at trigger input 114.

A second input 116 of the comparator 108 is fed with a random number RN=0 to 1 (e.g. 8 bit) delivered by a random number generator 118 via line 120. The random number generator 118 is also triggered by the camera event trigger signal ET at trigger input 122.

The comparator 108 produces a signal SD at its output 123 every time the replication probability r is more than the random number of the random number generator 118. The signal SD is fed to input D of a latch 124. A trigger input 126 of the latch 124 is fed with the camera event trigger signal ET supplied via delay member 110 and delay member 128 (both delay members are adjusted to compensate the worktime of comparator 108). Thus every time an event trigger signal occurs at input 126 of the latch 124 a ZERO is produced at its output Q when there is no signal SD at its input D. However, a ONE will be produced at the output Q of the latch 124, when a signal SD appears at latch input D together with an event trigger signal ET at latch trigger input 126.

The signal at the output Q of the latch 124 is supplied via line 130 to the reset input 132 of a delay monostable multivibrator 134 and to the reset input 136 of a second trigger monostable multivibrator 138. The delay monostable multivibrator 134 has a trigger input 140 and the second trigger monostable multivibrator 138 has a trigger input 142. Trigger input 142 of the second trigger monostable multivibrator is triggered by the signal output 144 of the delay monostable multivibrator 134.

However, the trigger input 140 of the delay monostable multivibrator 134 is triggered by the signal output 146 of a first trigger monostable multivibrator 148. This first trigger monostable multivibrator 148 comprises a trigger input 150 which is directly fed with the camera event trigger signal ET supplied via line 152.

Thus always when a camera event trigger signal ET appears at the trigger input 150 of the first trigger monostable multivibrator 148, a pulse P is produced at the multivibrator's output 146. This pulse P is fed to the trigger input of the delay monostable multivibrator 134 and it is also supplied via line 154 to a first input 156 of a gate 158. A second input 160 of the gate 158 is connected via line 162 with the output 164 of the second trigger monostable multivibrator 138. This second trigger monostable multivibrator 138 (delayed by the delay time of delay monostable multivibrator 134) delivers a second pulse P' at its output 164 in addition to a pulse P at the output 146 of the first trigger monostable multivibrator 148 always when the signal at the output Q of the latch 124 is a ONE. Under these circumstances, at the output 54 of the gate 158, which corresponds to the output of the data losses correcting circuit 40 in FIG. 1, for each detected radiation event between the ends of two succeeding evaluations times (a) one pulse P will be delivered when the output Q of the latch 148 is ZERO; and (b) a second pulse P' will be supplied when the output Q of the latch 148 is ONE.

For higher replication numbers m=3, 4, etc., correspondingly a third, fourth, etc., pulse has to be added. This can be done by connecting monostable multivibrators in parallel to monostable multivibrators 134 and 138. As indicated in FIG. 3 for m=3 parallel second delay monostable multivibrator 166 and parallel third trigger monostable multivibrator 168 can be activated by m-output 170 of the correction table 102 via gate 172. When m=3, gate 170 will be opened. The Q-signal can pass the third trigger monostable multivibrator 168 will produce a third pulse P'' in addition to first pulse P and second pulse P' when Q=ONE. More monostable multivibrators for m=4, 5, etc., can be added, if necessary, as indicated by dotted lines 174 and 176.

Having thus described the invention with particular reference to the preferred forms thereof, it will be obvious to those skilled in the art to which the invention pertains, after understanding the invention, that various changes and modifications may be made therein without department from the spirit and scope of the invention as defined by the claims appended hereto.

What is claimed is:

1. A method for correcting count rate losses of radiation events measured by a radiation detector due to detector deadtimes during an acquisition time, comprising the steps of:
   (a) detecting radiation events which are subject to deadtime losses during the acquisition time to obtain a succession of radiation detector event triggers;
   (b) providing for each detected radiation event a deadtime signal which corresponds to the deadtime generated by the detected radiation event;
   (c) subdividing the acquisition time into a succession of evaluation time intervals;
   (d) measuring the fractional amount of deadtime within each evaluation time interval to obtain a measure for count rate losses;
   (e) evaluating from the fractional amount of deadtime a replication probability r according to the equation $$r = DT'/(1 - DT')(m-1),$$

wherein DT' is the fractional amount of deadtime and m is a replication number only so large as to make the replication probability be less than one for any particular fractional amount of deadtime; and
   (f) evaluating all radiation events detected between the end of one evaluation time and the end of a following one to generate
      (f1) one pulse for each detected radiation event between the ends of the succeeding evaluation times; and
      (f2) a sequence of a number of pulses for randomly selected events which selection corresponds to the replication probability and which pulse number corresponds to the replication number.

2. A method according to claim 1, further comprising the steps of
   (a) generating a sequence of clock pulses; and
   (b) measuring the number of clock pulses generated during deadtimes occurring in each evaluation time interval;
wherein said measured number of clock pulses is a measure for the fractional amount of deadtime.

3. A method according to claim 2, further comprising the steps of:
   (a) counting the clock pulses during deadtimes by means of a counter having a certain count capacity; and
   (b) generating a sequence of clock pulses, the maximum number of those clock pulses that can occur during an evaluation time interval, corresponds to the count capacity of the counter.

4. A method according to claim 1, further comprising the steps of
   (a) comparing the replication probability with a random number;
   (b) generating a signal, when the replication probability is less than the random number; and
   (c) generating said sequence of a number of pulses for randomly selected events dependent on said signal.

5. A method according to claim 4, further comprising the steps of
   (a) generating a signal for the replication number; and
   (b) generating said sequence of a number of pulses for randomly selected events dependent on the signal for the replication number and the signal generated when the replication probability is less than the random number.

6. A method according to claim 1, wherein the deadtime signal is provided by producing a pulse every time and as long as a detected radiation event exceeds a detection threshold.

7. A circuit for correcting count rate losses of radiation events measured by a radiation detector due to detector deadtimes during an acquisition time, comprising:
   (a) means for detecting radiation events which are subject to deadtime losses during the acquisition time to obtain a succession of radiation detector event triggers;
   (b) means for providing for each detected radiation event a deadtime signal which corresponds to the deadtime generated by the detected radiation event;
   (c) means for subdividing the acquisition time into a succession of evaluation time intervals;
   (d) means for measuring the fractional amount of deadtime within each evaluation time interval to obtain a measure for count rate losses;
   (e) means for evaluating from the fractional amount of deadtime a replication probability r according to the equation $$r = DT'/(1-DT')(m-1),$$

wherein DT' is the fractional amount of deadtime and m is a replication number only so large as to make the replication probability be less than one for any particular fractional amount of deadtime; and
   (f) means for evaluating all radiation events detected between the ene of one evaluation time and the end of a following one to generate
      (f1) one pulse for each detected radiation event between the ends of the succeeding evaluation times; and
      (f2) a sequence of a number of pulses for randomly selected events which selection corresponds to the replication probability and which pulse number corresponds to the replication number.

8. A circuit according to claim 7, wherein said means for providing for each detected radiation event a deadtime signal comprises a threshold detector having a detection threshold for producing a pulse every time and as long as a detected radiation event exceeds the detection threshold.

9. A circuit according to claim 7, wherein said means for subdividing the acquisition time into a succession of evaluation time intervals comprises a pulse generator which periodically generates pulses having a duration corresponding to the evaluation time interval.

10. A circuit according to claim 7, wherein said means for measuring the fractional amount of deadtime comprises:
    (a) a clock for generating a sequence of clock pulses; and
    (b) a counter for measuring the number of clock pulses generated during deadtimes occurring in each evaluation time interval.

11. A circuit according to claim 10, wherein said counter having a certain count capacity and said clock generates a sequence of clock pulses, the maximum number of those clock pulses that can occur during an evaluation time interval, corresponds to the count capacity of the counter.

12. A circuit according to claim 10, further comprising:
    (a) a pulse generator which periodically generates pulses having a duration corresponding to the evaluation time interval; and
    (b) a gate;
wherein said pulses of said pulse generator, said clock pulses of said clock and the deadtime signals are supplied to said counter via said gate.

13. A circuit according to claim 7, wherein said means for evaluating the replication probability comprises a correction table.

14. A circuit according to claim 7, further comprising:
    (a) a comparator; and
    (b) a random generator for a random number;
wherein said comparator is provided for comparing said replication probability with said random number and for generating a signal, when the replication probability is less than the random number.

15. A circuit according to claim 14, wherein said means for generating said sequence of a number of pulses comprises at least one trigger monostable multivibrator for generating one pulse in addition to a detected radiation event in response to said signal of said comparator.

16. A circuit according to claim 15, wherein said trigger monostable multivibrator comprises a delay means for the delayed generating of its additional pulse.

17. A circuit according to claim 7, further comprising:
    (a) means for generating a signal for the replication number; and
    (b) means for generating said sequence of a number of pulses for randomly selected events dependent on the signal for the replication number and the signal generated when the replication probability is less than the random number.

18. A circuit according to claim 17, wherein said means for generating said sequence of a number of pulses comprises a number m−1 of trigger monostable multivibrators, wherein m is the replication number, said trigger monostable multivibrators in dependance on said signal for the replication number delivers m−1 pulses in addition to a detected radiation event in response to said signal of said comparator.

19. A circuit according to claim 18, wherein each of said trigger monostable multivibrators comprises a delay means for the delayed generating of the additional pulses.

20. A circuit according to claim 7, wherein said means for detecting radiation events comprises a trigger monostable multivibrator which upon each event trigger generates a pulse.

* * * * *